United States Patent [19]
White et al.

[11] 3,715,367
[45] Feb. 6, 1973

[54] SUBSTITUTED 2-(2-IMIDAZOLIN-2-YLTHIO)ACETOPHENONES

[75] Inventors: Halbert C. White, Indianapolis, Ind.; Stanley J. Strycker; Don V. Wysong, both of Midland, Mich.

[73] Assignee: The Dow Chemical Company, Midland, Mich.

[22] Filed: March 1, 1971

[21] Appl. No.: 119,824

[52] U.S. Cl. .............................. 260/309.6, 424/273
[51] Int. Cl. ............................................ C07d 49/34
[58] Field of Search ............................ 260/309.6

[56] References Cited

UNITED STATES PATENTS 3,190,887   6/1965   Hensley et al. .................... 260/309.6

OTHER PUBLICATIONS

Fefer et al., J. Org. Chem. 1961, vol. 26, pages 828–835, QD241.J6.
Mazur et al., Chem. Abst. 1970, vol. 73, no. 87855m, QD1.A51.
Krasovskii et al., Chem. Abst. 1969, vol. 71, No. 220645, QD1.A51.
Chadha et al., Can. J. Chem. 1969, vol. 47, pages 2843–2847, QD1.C2.
Chadha et al., Aust. J. Chem. 1969, vol. 22, pages 2697–2701, QD1.A9.

Primary Examiner—Natalie Trousof
Attorney—Griswold & Burdick, Gary D. Street and C. Kenneth Bjork

[57] ABSTRACT

This invention provides substituted compounds corresponding to the formula:

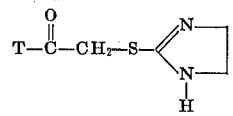

wherein

T represents 2-hydroxy-5-methylphenyl, 4-acetamidophenyl, 4-fluorophenyl, 3,4-dichlorophenyl, 3,4-difluorophenyl or 3-trifluoromethylphenyl and their pharmaceutically-acceptable salts, useful as anorectics and as intermediates in the preparation of corresponding bicyclic imidazo-thiazole compounds having antidepressant activity.

6 Claims, No Drawings

SUBSTITUTED 2-(2-IMIDAZOLIN-2-YLTHIO)ACETOPHENONES

BACKGROUND OF THE INVENTION

Para-substituted 2-phenacylmercapto-2-imidazolines (e.g., p-bromo, p-chloro, p-nitro and p-hydroxy) are described by Fefer and King, J. Org. Chem., 26, 828 (1961), and by Chadha et al. in Can. J. Chem., 47, 2843 (1969) and Aust. J. Chem., 22, 2697 (1969).

SUMMARY OF THE INVENTION

The present invention is directed to a series of novel substituted 2-(2-imidazolin-2-ylthio)acetophenone compounds corresponding to the formula:

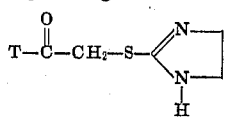

wherein
T represents 2-hydroxy-5-methylphenyl, 4-acetamidophenyl, 4-fluorophenyl, 3,4-dichlorophenyl, 3,4-difluorophenyl or 3-trifluoromethylphenyl and their pharmaceutically-acceptable salts, useful as anorectics and as intermediates in the preparation of corresponding bicyclic imidazo-thiazole compounds having antidepressant activity.

The term "pharmaceutically-acceptable salt" as used herein refers to salts of the substituted 2-(2-imidazolin-2-ylthio)acetophenone compounds (hereinafter referred to as the "acetophenone" compounds) which are substantially non-toxic at dosages consistent with good pharmacological activity. Such pharmaceutically-acceptable salts include non-toxic addition salts with inorganic acids such as hydrochloric, hydrobromic, sulfuric or phosphoric acid, or with organic acids such as acetic, succinic, maleic, tartaric or citric acid, or with organic sulfonic acids such as methanesulfonic or p-toluenesulfonic acid.

The substituted acetophenone compounds of the present invention are crystalline solids which are of varying degrees of solubility in organic solvents such as acetone and benzene and only slightly soluble in water. The pharmaceutically acceptable salts of the novel compounds are soluble in water and slightly soluble in organic solvents such as acetone and benzene. The novel acetophenone compounds of the present invention possess pharmacological activity when administered to laboratory animals, and are further useful as intermediates in the preparation of corresponding bicyclic imidazo-thiazole compounds which also possess useful pharmacological activity in animals.

The novel compounds of the present invention are prepared by the reaction of an α-haloacetophenone compound corresponding to the following formula:

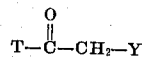

wherein
Y is bromo, chloro or fluoro, and
T is as previously defined,
with ethylenethiourea.

The reaction is usually carried out in the presence of an inert solvent as a carrier medium at a temperature of from about 0° to about 40°C. Representative inert solvents operable in the present invention as carrier media include, for example, acetone, ethanol, acetonitrile and the like. The exact proportions of the reactants employed is not critical; however, the reaction ordinarily consumes the reactants in amounts representing essentially equimolar proportions of each and the use of such amounts is preferred. Generally, the reaction is carried out over a period of from about 1 to about 24 hours in order to assure substantial completion of the reaction. Following the completion of the reaction, the desired acetophenone compounds can be recovered from the reaction mixture by employing conventional techniques.

DESCRIPTION OF THE PREFERRED EMBODIMENTS

The following examples illustrate the invention but as such are not to be construed as limiting.

EXAMPLE 1

Ethylenethiourea (5.95 grams; 0.056 mole) and 900 milliliters of acetone were mixed and the resulting mixture was stirred at about 35°C. until a complete solution was obtained. Following the dissolution of the ethylenethiourea, the solution was filtered and cooled to about 27°C. A solution of α-bromo-3,4-dichloroacetophenone (15.0 grams; 0.056 mole) in 100 milliliters of acetone was added with stirring and in a short period of time a solid product was formed. Stirring was continued for about 2 hours at room temperature at which time the resultant solid was filtered off to obtain 3',4'-dichloro-2-(2-imidazolin-2-ylthio)acetophenone hydrobromide as a white crystalline solid melting at 180°–181°C. The structure of the product was confirmed by nuclear magnetic reasonance spectroscopy.

In substantially the same procedure described above, the following acetophenone compounds are prepared.

2'-hydroxy-2-(2-imidazolin-2-ylthio)-5'-methyl-acetophenone hydrochloride, having a melting point of 192°–193°C., is prepared by the reaction of α-chloro-2'-hydroxy-5'-methylacetophenone and ethylenethiourea.

2-((2-imidazolin-2-ylthio)-3'-trifluoromethyl)-acetophenone hydrobromide, having a melting point of 250°–252°C., is prepared by the reaction of α-bromo-3'-trifluoromethylacetophenone and ethylenethiourea.

3',4'-difluoro-2-(2-imidazolin-2-ylthio)acetophenone hydrobromide, having a melting point of 147°–149°C., is prepared by the reaction of α-bromo-3',4'-difluoroacetophenone and ethylenethiourea.

4'-((2-imidazolin-2-ylthio)acetyl)acetanilide hydrobromide, having a molecular weight of 358 and melting above 280°C., is prepared by the reaction of 4'-acetamido-α-bromoacetophenone and ethylenethiourea.

4'-fluoro-2-(2-imidazolin-2-ylthio)acetophenone hydrobromide, having a melting point of 160°–162°C., is prepared by the reaction of α-bromo-4'-fluoroacetophenone and ethylenethiourea.

The novel acetophenone compounds of the present invention possess pharmacological activity when administered to laboratory animals, and are further useful as intermediates in the preparation of corresponding bicyclic imidazo-thiazole compounds which also possess useful pharmacological activity in animals. More particularly, the acetophenone compounds wherein T represents 4-fluorophenyl, 3-trifluoromethylphenyl, 3,4-difluorophenyl or 3,4-dichlorophenyl have been found to possess potent anorectic or anorexigenic properties, whereas the known (p-bromo) and (p-chloro)-2-phenacylmercapto-2-imidazoline compounds have been found to be of minimal anorectic activity. Moreover, the acetophenone compounds wherein T represents 2-hydroxy-5-methylphenyl, 4-acetamidophenyl or 3,4-dichlorophenyl are particularly useful as intermediates in the preparation of corresponding bicyclic imidazo-thiazole compounds which are active as antidepressants. For such uses, the preferred form of the substituted acetophenone or corresponding bicyclic imidazo-thiazole compounds is a pharmaceutically acceptable salt thereof, such as one of those previously defined. Preferably, the hydrochloride and hydrobromide salts are employed.

Generally, anorexia is induced in a host animal by the oral administration of from about 1 to about 250 or more milligrams of the acetophenone compound per kilogram of animal body weight. When administered by intraperitoneal injection, good results are obtained with an anorectic amount of from 1 to about 50 or more milligrams of acetophenone compound per kilogram of animal body weight.

In order to provide adequate dosage forms, the present invention also contemplates incorporating the active acetophenone compounds in solid or liquid unit dosage forms such as tablets, capsules, lozenges, elixirs, syrups, suspensions and the like, or in other forms readily subdividable into unit dosage forms. The active acetophenone compounds can also be formulated in conventional timed release capsule or tablet formulations, in which case the preferred dosage per unit is from about 50 milligrams or less to about 300 milligrams or more per unit.

In representative operations, separate sterile compositions comprising 4'-fluoro-2-(2-imidazolin-2-ylthio)-acetophenone hydrobromide, 3',4'-difluoro-2-(2-imidazolin-2-ylthio)acetophenone hydrobromide and 3',4'-dichloro-2-(2-imidazolin-2-ylthio)acetophenone hydrobromide in a 0.5 percent aqueous hydroxypropyl methyl cellulose suspension were prepared and administered to groups of mice. The compounds are administered at various dosage rates by intraperitoneal injection. Prior to administration of the acetophenone compound the mice have been trained to eat a conventional rodent chow during a 6-hour period daily, the mice being presented with water ad libitum, but no food during the remaining 18 hours each day. The acetophenone compounds are administered about 17 to 18 hours following the end of the latest feeding period. After administration of the test compounds the mice in each group are presented with a weighed amount of rodent chow. Separate groups of similar mice are similarly trained, starved and presented with food to serve as a check. However, the check groups are administered only a 0.5 percent aqueous hydroxypropyl methyl cellulose suspension containing no acetophenone compound. Feed consumption by the groups of mice is determined after one hour and three hours, respectively, by weighing the rodent chow remaining at such times, and recording the difference in weight between feed presented and feed remaining as food consumption or food intake. By comparing the average group food intake of the control mice with the average group food intake of the treated mice, the percent reduction of food intake in the treated mice is calculated. The percent reduction of food intake in the treated mice obtained at the various dosage rates of acetophenone compound employed after one and three hours, respectively, is set forth in the following table:

TABLE I

Anorectic Activity of Acetophenone Compounds

| Run No. | Test Compound | Dose mg/Kg | % Reduction of Food Intake | |
|---|---|---|---|---|
| | | | 1 hour | 3 hours |
| 1a. | 3',4'-dichloro-2-(2-imidazolin-2-ylthio)acetophenone hydrobromide | 10 38 | 16 | |
| b. | do. | 21 60 | 36 | |
| c. | do. | 46 88 | 58 | |
| 2a. | 4'-fluoro-2-(2-imidazolin-2-ylthio)acetophenone hydrobromide | 10 12 | 16 | |
| b. | do. | 21 31 | 16 | |
| c. | do. | 46 76 | 35 | |
| 3a. | 3',4'-difluoro-2-(2-imidazolin-2-ylthio)acetophenone hydrobromide | 10 16 | 0 | |
| b. | do. | 21 43 | 22 | |
| c. | do. | 46 85 | 46 | |

In similar operations, separate test groups of mice are separately administered 3',4'-dichloro-2-(2-imidazolin-2-ylthio)acetophenone hydrobromide, 3',4'-difluoro-2-(imidazolin-2-ylthio)acetophenone hydrobromide or 4'-fluoro-2-(2-imidazolin-2-ylthio)acetophenone hydrobromide orally at various dosage rates. Feed consumption by the treated groups and control groups of mice is determined as described above after 1 and 3 hours, respectively, and the percent reduction of food intake in the treated mice is determined. The percent reduction of food intake in the treated mice obtained at the various dosage rates of acetophenone compound employed after 1 and 3 hours, respectively, is set forth in the following table:

TABLE II

Anorectic Activity of Acetophenone Compounds

| Run No. | Test Compound | Dose mg/Kg | % Reduction of Food Intake |
|---|---|---|---|

| | | 1 hour | 3 hours |
|---|---|---|---|
| 1a. | 3',4'-dichloro-2-(2-imidazolin-2-ylthio)acetophenone hydrobromide | 10 27 | 20 |
| b. | do. | 21 43 | 12 |
| c. | do. | 46 92 | 34 |
| 2a. | 4'-fluoro-2-(2-imidazolin-2-ylthio)acetophenone hydrobromide | 10 31 | 33 |
| b. | do. | 21 24 | 11 |
| c. | do. | 46 54 | 37 |
| 3a. | 3',4'-difluoro-2-(2-imidazolin-2-ylthio)acetophenone hydrobromide | 10 16 | 3 |
| b. | do. | 21 15 | 0 |
| c. | do. | 46 55 | 12 |

In further representative operations, separate groups of rats are presented with milk, and the milk consumption of each rat during a 30-minute period on two successive days prior to oral or intraperitoneal administration of an acetophenone test compound is recorded. Milk consumption during a comparable 30-minute period following administration of a test compound at various dosage rates is recorded and the average milk intake before and after administration of the acetophenone test compound employed is compared in the following Table III:

was stirred at reflux temperature for a period of about 4 hours. Following the completion of the reaction, the reaction solution was cooled and filtered and the 3-(3,4-dichlorophenyl)-5,6-dihydroimidazo-(2,1-b)thiazole hydrobromide product was collected as a pale tan crystalline solid and found to melt at 250°–252°C. The structure of the product was confirmed by nuclear magnetic reasonance spectroscopy.

In substantially the same procedure described above, the following bicyclic imidazo-thiazole compound is prepared:

2-(5,6-dihydroimidazo(2,1-b)thiazol-3-yl)-p-cresol hydrochloride melting at 228°–229°C. is prepared from 2'-hydroxy--(2-imidazolin-2-ylthio)-5'-methylacetophenone hydrochloride.

EXAMPLE 3

4'-((2-imidazolin-2-ylthio)acetyl)acetanilide hydrobromide (12.0 grams; 0.0347 mole) was mixed with 40 milliliters of 5N hydrobromic acid and 40 milliliters of water. The resulting mixture was heated, with agitation, at the boiling temperature under reflux for a period of about 2 hours. Following the reaction period, the reaction mixture was cooled and evaporated under reduced pressure to obtain the product as a solid residue. The residue was mixed with isopropyl alcohol and the resulting slurry filtered to obtain the desired 3-

TABLE III

Anorectic effect of acetophenone compounds on milk intake of rats

| Run No. | Compound | Mode of administration | Dose, mg./kg. | Milk intake in milliliters in 30-minute intervals | | Percent reduction of milk intake |
|---|---|---|---|---|---|---|
| | | | | Pre-treatment | Post-treatment | |
| 1a | 3',4'-dichloro-2-(imidazolin-2-ylthio)acetophenone hydrobromide. | Oral | 2.1 | 19.3 | 16.4 | 15 |
| 1b | do | do | 4.6 | 17.6 | 9.0 | 49 |
| 1c | do | do | 10.0 | 20.5 | 7.2 | 65 |
| 1d | do | do | 21.0 | 16.1 | 3.1 | 81 |
| 1e | do | do | 46.0 | 21.1 | 3.2 | 85 |
| 2a | do | Intraperitoneal | 1.0 | 19.9 | 9.7 | 51 |
| 2b | do | do | 2.1 | 18.2 | 10.9 | 40 |
| 2c | do | do | 4.6 | 17.2 | 4.6 | 73 |
| 2d | do | do | 10.0 | 17.3 | 3.1 | 82 |
| 2e | do | do | 21.0 | 15.6 | 0.1 | 99 |
| 3a | 4'-fluoro-2-(2-imidazolin-2-ylthio)acetophenone hydrobromide. | Oral | 4.6 | 15.9 | 17.5 | 0 |
| 3b | do | do | 10.0 | 18.2 | 17.7 | 3 |
| 3c | do | do | 21.0 | 15.3 | 7.7 | 50 |
| 3d | do | do | 46.0 | 17.3 | 10.8 | 38 |
| 4a | do | Intraperitoneal | 4.6 | 19.2 | 18.4 | 4 |
| 4b | do | do | 10.0 | 17.5 | 7.7 | 56 |
| 4c | do | do | 21.0 | 16.8 | 10.0 | 41 |
| 4d | do | do | 46.0 | 17.8 | 4.4 | 75 |
| 5a | 2-((2-imidazolin-2-ylthio)-3'-trifluoromethyl)-acetophenone hydrobromide. | Oral | 10.0 | 15.6 | 17.4 | 0 |
| 5b | do | do | 21.0 | 17.1 | 17.3 | 0 |
| 5c | do | do | 46.0 | 17.6 | 12.5 | 29 |
| 6a | do | Intraperitoneal | 10.0 | 19.0 | 15.1 | 20 |
| 6b | do | do | 21.0 | 16.0 | 12.5 | 21 |
| 6c | do | do | 46.0 | 16.0 | 9.3 | 42 |

The novel compounds of the present invention, particularly wherein T represents 3,4-dichlorophenyl, 2-hydroxy-5-methylphenyl or 4-acetamidophenyl, are further useful as intermediates in the preparation of corresponding bicyclic imidazo-thiazole compounds according to the procedures of the following examples.

EXAMPLE 2

3',4'-dichloro-2-(imidazolin-2-ylthio)acetophenone hydrobromide (10.0 grams; 0.026 mole) was mixed with 150 milliliters of 2-B ethanol. The mixture was heated at the boiling temperature under reflux with stirring to dissolve the 3',4'-dichloro-2-(imidazolin-2-ylthio)acetophenone reactant. The resulting solution (4-aminophenyl)-5,6-dihydroimidazo(2,1-b)thiazole dihydrobromide as a crystalline solid melting at 289°–291°C.

The antidepressant activity of the bicyclic imidazo-thiazole compounds is illustrated by their effectiveness in increasing the effects of d-amphetamine in mice. In these operations, groups of 10 mice were administered one of the bicyclic imidazo-thiazole compounds at a predetermined dosage rate by intraperitoneal injection and aggregated by confining them to a cage small enough to maintain the mice in close proximity to one another. About 30 minutes after the administration of the test compound, the mice were dosed with 3–4 milligrams per kilogram of d-amphetamine sulfate by intraperitoneal injection. Similar groups of mice were similarly administered saline solution, similarly treated with amphetamine, and aggregated for comparison. The administration of 3–4 milligrams per kilogram of amphetamine to aggregated mice not pre-treated with a compound having central nervous system activity normally produces excitation but not toxicity. Potentiation of amphetamine-induced toxicity in aggregated mice is indicated by death of the animals within 5 hours. The dosage of representative bicyclic imidazo-thiazole compounds effective to produce mortality in 50 percent of the mice (ED 50) was determined and is summarized in the following table.

TABLE IV

| Run No. | Compound | ED 50 mg/Kg |
| --- | --- | --- |
| 1. | 3-(p-aminophenyl)-5,6-dihydro-imidazo-(2,1- -b)thiazole dihydrobromide | 6.23 |
| 2. | 2-(5,6-dihydroimidazo-(2,1-b)thiazol-3-yl)- -p-cresol hydrochloride | 16.3 |
| 3. | 3-(3,4-dichlorophenyl)-5,6-dihydro-imidazo- -(2,1-b)thiazole hydrobromide | 7.8 |

The α-haloacetophenone and ethylenethiourea reactants employed in the present invention are known compounds and can be prepared by methods known in the literature or readily obtained from commercial sources.

What is claimed is:

1. A compound corresponding to the formula:

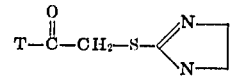

wherein
T represents 4-acetamidophenyl, 3-trifluoromethylphenyl, 4-fluorophenyl, 3,4-dichlorophenyl or 3,4-difluorophenyl or the pharmaceutically acceptable salts thereof.

2. A compound according to claim 1 which is 3',4'-dichloro-2-(2-imidazolin-2-ylthio)acetophenone hydrobromide.

3. A compound according to claim 1 which is 4'-fluoro-2-(2-imidazolin-2-ylthio)acetophenone hydrobromide.

4. A compound according to claim 1 which is 4'-((2-imidazolin-2-ylthio)acetyl)acetanilide hydrobromide.

5. A compound according to claim 1 which is 2-((2-imidazolin-2-ylthio)-3'-trifluoromethyl)acetophenone hydrobromide.

6. A compound according to claim 1 which is 3',4'-difluoro-2-(2-imidazolin-2-ylthio)acetophenone hydrobromide.

* * * * *

UNITED STATES PATENT OFFICE
CERTIFICATE OF CORRECTION

Patent No. 3,715,367     Dated February 6, 1973

Inventor(s) Halbert C. White et al.

It is certified that error appears in the above-identified patent and that said Letters Patent are hereby corrected as shown below:

Column 4, Table I should appear as shown below:

TABLE I

Anorectic Activity of Acetophenone Compounds

| Run No. | Test Compound | Dose mg/Kg | % Reduction of Food Intake | |
|---|---|---|---|---|
| | | | 1 hour | 3 hours |
| 1a. | 3',4'-dichloro-2-(2-imidazolin-2-ylthio)acetophenone hydrobromide | 10 | 38 | 16 |
| b. | do. | 21 | 60 | 36 |
| c. | do. | 46 | 88 | 58 |
| 2a. | 4'-fluoro-2-(2-imidazolin-2-ylthio)acetophenone hydrobromide | 10 | 12 | 16 |
| b. | do. | 21 | 31 | 16 |
| c. | do. | 46 | 76 | 35 |
| 3a. | 3',4'-difluoro-2-(2-imidazolin-2-ylthio)acetophenone hydrobromide | 10 | 16 | 0 |
| b. | do. | 21 | 43 | 22 |
| c. | do. | 46 | 85 | 46 |

UNITED STATES PATENT OFFICE
CERTIFICATE OF CORRECTION

Patent No. 3,715,367      Dated February 6, 1973

Inventor(s) Halbert C. White et al.     Page - 2

It is certified that error appears in the above-identified patent and that said Letters Patent are hereby corrected as shown below:

Columns 4 and 5, Table II, should appear as shown below:

TABLE II

Anorectic Activity of Acetophenone Compounds

| Run No. | Test Compound | Dose mg/Kg | % Reduction of Food Intake | |
|---|---|---|---|---|
| | | | 1 hour | 3 hours |
| 1a. | 3',4'-dichloro-2-(2-imidazolin-2-ylthio)acetophenone hydrobromide | 10 | 27 | 20 |
| b. | do. | 21 | 43 | 12 |
| c. | do. | 46 | 92 | 34 |
| 2a. | 4'-fluoro-2-(2-imidazolin-2-ylthio)acetophenone hydrobromide | 10 | 31 | 33 |
| b. | do. | 21 | 24 | 11 |
| c. | do. | 46 | 54 | 37 |
| 3a. | 3',4'-difluoro-2-(2-imidazolin-2-ylthio)acetophenone hydrobromide | 10 | 16 | 3 |
| b. | do. | 21 | 15 | 0 |
| c. | do. | 46 | 55 | 12 |

Signed and sealed this 15th day of October 1974.

(SEAL)
Attest:

McCOY M. GIBSON JR.
Attesting Officer

C. MARSHALL DANN
Commissioner of Patents